United States Patent
Schoinas et al.

(10) Patent No.: US 6,347,362 B1
(45) Date of Patent: Feb. 12, 2002

(54) FLEXIBLE EVENT MONITORING COUNTERS IN MULTI-NODE PROCESSOR SYSTEMS AND PROCESS OF OPERATING THE SAME

(75) Inventors: Ioannis T. Schoinas, Portland; Ali S. Oztaskin, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,577

(22) Filed: Dec. 29, 1998

(51) Int. Cl.[7] .............................................. G06F 13/00
(52) U.S. Cl. ...................... 711/147; 711/148; 711/149; 711/150; 711/151; 711/162
(58) Field of Search ........................ 711/147–152, 165, 711/170; 709/215; 710/60; 712/200; 714/47

(56) References Cited

U.S. PATENT DOCUMENTS

| | | | | |
|---|---|---|---|---|
| 5,269,013 A | * | 12/1993 | Abramson et al. | 711/170 |
| 5,727,150 A | * | 3/1998 | Laudon et al. | 709/215 |
| 6,000,044 A | * | 12/1999 | Chrysos et al. | 714/47 |
| 6,058,440 A | * | 5/2000 | Bloch et al. | 710/60 |
| 6,092,180 A | * | 7/2000 | Anderson et al. | 712/200 |

* cited by examiner

Primary Examiner—Than Nguyen
(74) Attorney, Agent, or Firm—Antonelli, Terry, Stout & Kraus, LLP

(57) ABSTRACT

A flexible event monitoring counter apparatus and process are provided for a processor system including a plurality of nodes, each node having a processor and a portion of a total main memory of the processor system. One example of such a processor system is a Non-Uniform-Memory-Architecture (NUMA) system. In order to reduce the total number of counters necessary, the counter structure will track certain ones of a type of event which occur in the processor system, determined in accordance with a predetermined standard to be most interesting, while discarding other ones of the same type of event determined by the standard to be less interesting. In accordance with one embodiment, the type of event which is tracked or discarded can be page accesses to pages of the total main memory. The standard of most interesting events can be based on the pages which receive the most requests for remote access from a node other than the node where the requested page is located. The information regarding the most interesting events can be used, if desired, to make decisions regarding migration and/or replication of pages between the different nodes.

30 Claims, 12 Drawing Sheets

MIGRATION CONSTANTS AT NODE #2 FOR ALL BUS/PORT TRANSACTIONS

| TRANSACTION SOURCE | COUNTER #1 | COUNTER #2 | ... | COUNTER #N | COST |
|---|---|---|---|---|---|
| NODE #1 | $M_R$ | 0 | | 0 | $M_R$ |
| NODE #2 | $M_L$ | $M_L$ | | $M_L$ | $N*M_L$ |
| ... | | | | | |
| NODE #N | 0 | 0 | | $M_R$ | $M_R$ |

NORMALLY, $M_L<0, M_R>0$

FIG. 5A

REPLICATION CONSTANTS AT NODE #2 FOR BRL TRANSACTIONS

| TRANSACTION SOURCE | COUNTER #1 | COUNTER #2 | ... | COUNTER #N | COST |
|---|---|---|---|---|---|
| NODE #1 | $R_R$ | 0 | | 0 | $R_R$ |
| NODE #2 | 0 | 0 | | 0 | 0 |
| ... | | | | | |
| NODE #N | 0 | 0 | | $R_R$ | $R_R$ |

FIG. 5B

REPLICATION CONSTANTS AT NODE #2 FOR BRIL/BIL TRANSACTIONS

| TRANSACTION SOURCE | COUNTER #1 | COUNTER #2 | ... | COUNTER #N | COST |
|---|---|---|---|---|---|
| NODE #1 | $R_W$ | $R_W$ | | $R_W$ | $N^*R_W$ |
| NODE #2 | $R_W$ | $R_W$ | | $R_W$ | $N^*R_W$ |
| ... | | | | | |
| NODE #N | $R_W$ | $R_W$ | | $R_W$ | $N^*R_W$ |

NORMALLY, $R_R>0, R_W<0$

FIG. 6

AGING CONSTANTS

| TRANSACTION SOURCE | COUNTER #1 | COUNTER #2 | ... | COUNTER #N | COST |
|---|---|---|---|---|---|
| AGING | $S_A$ | $S_A$ | | $S_A$ | $C_A$ |

NORMALLY, $S_A<0, C_A<0$

FIG. 7

MIGRATION CONSTANTS AT NODE #2 FOR ALL BUS/PORT TRANSACTIONS
SET COUNTERS STRICTLY INCREASE BY ONE

| TRANSACTION SOURCE | COST |
|---|---|
| NODE #1 | $M_R$ |
| NODE #2 | $N*M_L$ |
| ... | |
| NODE #N | $M_R$ |

REPLICATION CONSTANTS AT NODE #2 FOR BRIL/BIL TRANSACTIONS

| TRANSACTION SOURCE | COST |
|---|---|
| NODE #1 | $N*R_W$ |
| NODE #2 | $N*R_W$ |
| ... | |
| NODE #N | $N*R_W$ |

REPLICATION CONSTANTS AT NODE #2 FOR BRL TRANSACTIONS

| TRANSACTION SOURCE | COST |
|---|---|
| NODE #1 | $R_R$ |
| NODE #2 | 0 |
| ... | |
| NODE #N | $R_R$ |

FLEXIBLE EVENT MONITORING COUNTERS IN MULTI-NODE PROCESSOR SYSTEMS AND PROCESS OF OPERATING THE SAME

FIELD OF THE INVENTION

The present invention relates generally to processor systems, and, more particularly, to Non-Uniform-Memory-Architecture (NUMA) systems, having a plurality of nodes which each include a processor and a portion of the total memory of the NUMA system.

BACKGROUND OF THE INVENTION

NUMA systems are a developing area of processor systems which permit sharing a total main memory among a plurality of nodes of the system. The overhead of accessing pages of the main memory depends on the location of the pages since access to pages in the same node as the processor is faster than access to memory located at another node. Therefore, in NUMA systems, performance can improve if the operating system migrates or replicates specific pages to other nodes since this reduces the coherence bandwidth requirements and the average latency of the memory accesses. In migration, the single copy of the page is transferred to another node, whereas, in replication, an extra copy of the page is provided at another node.

In order for the operating system to implement replication and migration, the best candidate pages for migration or replication need to be identified. One of the early systems directed to identifying good candidates was U.S. Pat No. 5,269,013 to Abramson et al. The Abramson et al. scheme uses a hardware buffer structure on each node to store samples from the stream of memory requests. Periodically, an operating system daemon examines the contents of the buffer memory. The sampled information from this is used to maintain an ordered list of pages in local memory order where the most frequently referenced page will be at the top of the list. The sample information is also used to maintain a hash table of remote pages accessed by the node processor. The daemon also maintains a counter that represents the average number of samples that refer to local pages. If the number of accesses to a remote page exceeds the average number of samples referring to local pages, the remote page is considered a candidate for migration. If no free pages exist in the local node, the least recently referenced page will be moved to a remote memory.

U.S. Pat. No. 5,727,150 to Laudon et al. shows another system for migrating or replicating a page. In the approach disclosed there, every page in the system is associated with a set of counters that count the read/write requests to a page on a per node basis. For each page, the operating system can also define a threshold value stored along with the counters. If the difference between the number of requests from the local node and a remote node exceeds the threshold for the page, an interrupt is delivered to the node processor in order to notify the operating system of this event. The operating system can then choose to migrate or replicate the page.

Although the above described systems use page migration/replication policies that are capable of identifying the best candidate pages for migration/replication and then performing these operations, they suffer from a number of drawbacks. For example, in these systems, information is collected for all pages in the system. By virtue of this, the storage requirements are very large.

In addition, in systems such as described in the Laudon et al. patent, an interrupt is triggered when a page is declared a possible candidate for migration/replication. This incurs an undesirable interrupt overhead. In systems such as that disclosed in the Abramson et al. patent, an operating system daemon process is required to maintain the counters, thus incurring an undesirable software overhead in the operating system. Also, in the Abramson et al. arrangement, if the operating system is over-committed and does not examine the samples, the maintenance of the counters will cease. Accordingly, it is necessary to design the operating system to avoid this problem.

SUMMARY OF THE INVENTION

A processor system, and method of operating the same, is provided which includes a plurality of nodes, each including a processor and a portion of the total main memory of the processor system. A counter is provided which tracks certain ones of a type of event which occur in the processor system, determined to be the most interesting ones in accordance with a predetermined standard. On the other hand, the counter discards other ones of the same type of event determined by the standard to be less interesting.

BRIEF DESCRIPTION OF THE DRAWINGS

FIG. 3 shows an exemplary register set structure which can be used in the NUMA counter of FIG. 2.

FIGS. 4, 5A, 5B and 6 show exemplary constants tables which can be used for the constant table of FIG. 2.

FIGS. 7, 8A and 8B show alternative exemplary constants tables, specifically condensed constant tables.

DETAILED DESCRIPTION OF THE INVENTION

Figure 1:
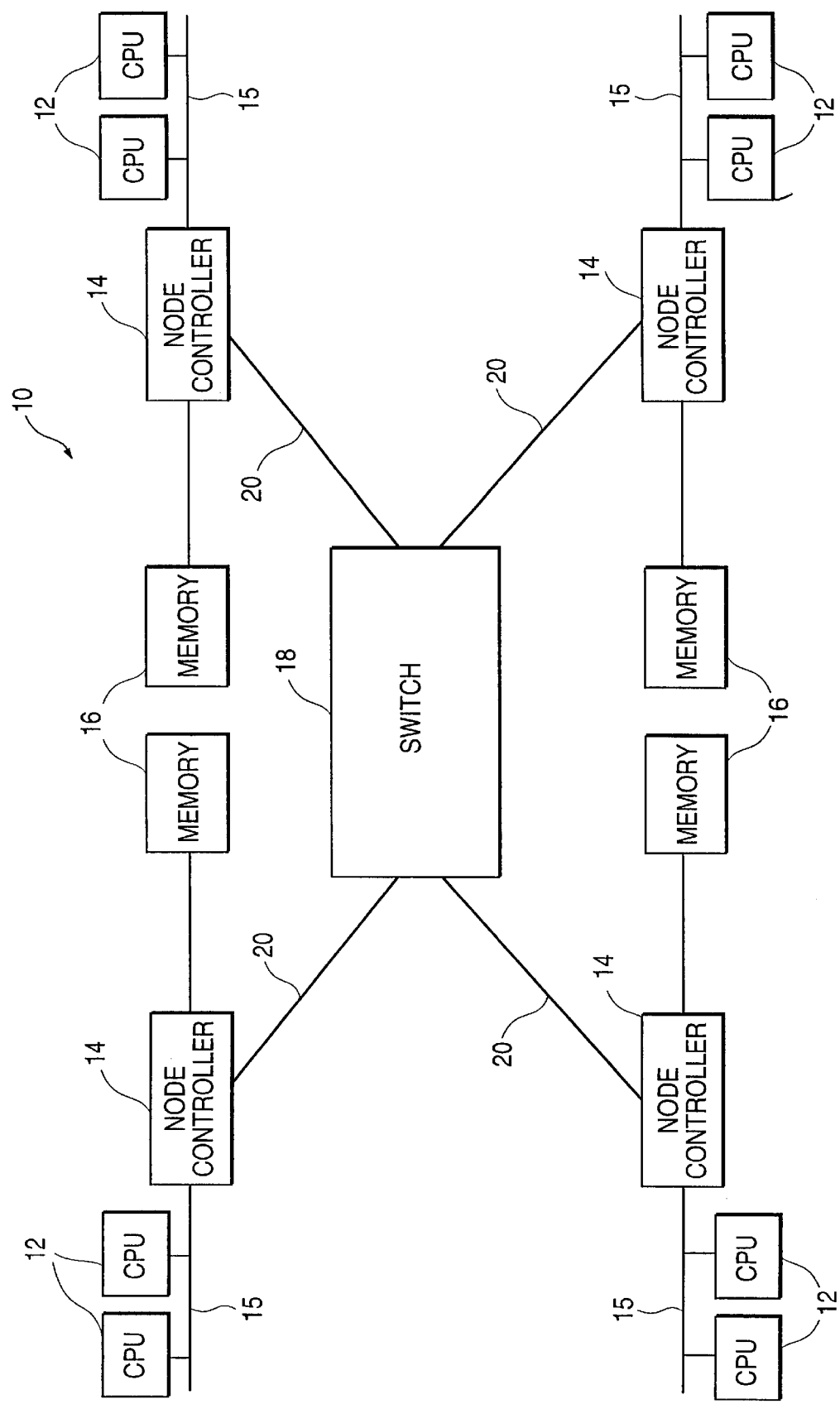
FIG. 1 shows an exemplary diagram of a NUMA system in accordance with the present invention.

Referring to FIG. 1, an overall processor system, specifically a NUMA system 10, is shown as an exemplary system which can utilize the present invention. The NUMA system 10 includes a plurality of nodes, each having one or more processors 12, a node controller 14 connected with the processors via a front side bus 15 (FSB) and a node memory 16. In each case, the node memory 16 holds a portion of the total main memory of the NUMA system 10. A switch 18 is provided to interconnect the node controllers 14, while scalability ports 20 are provided to link the node controllers with the switch. Thus, each node can be connected with any other node through the scalability ports 20 and the switch 18.

Figure 2:
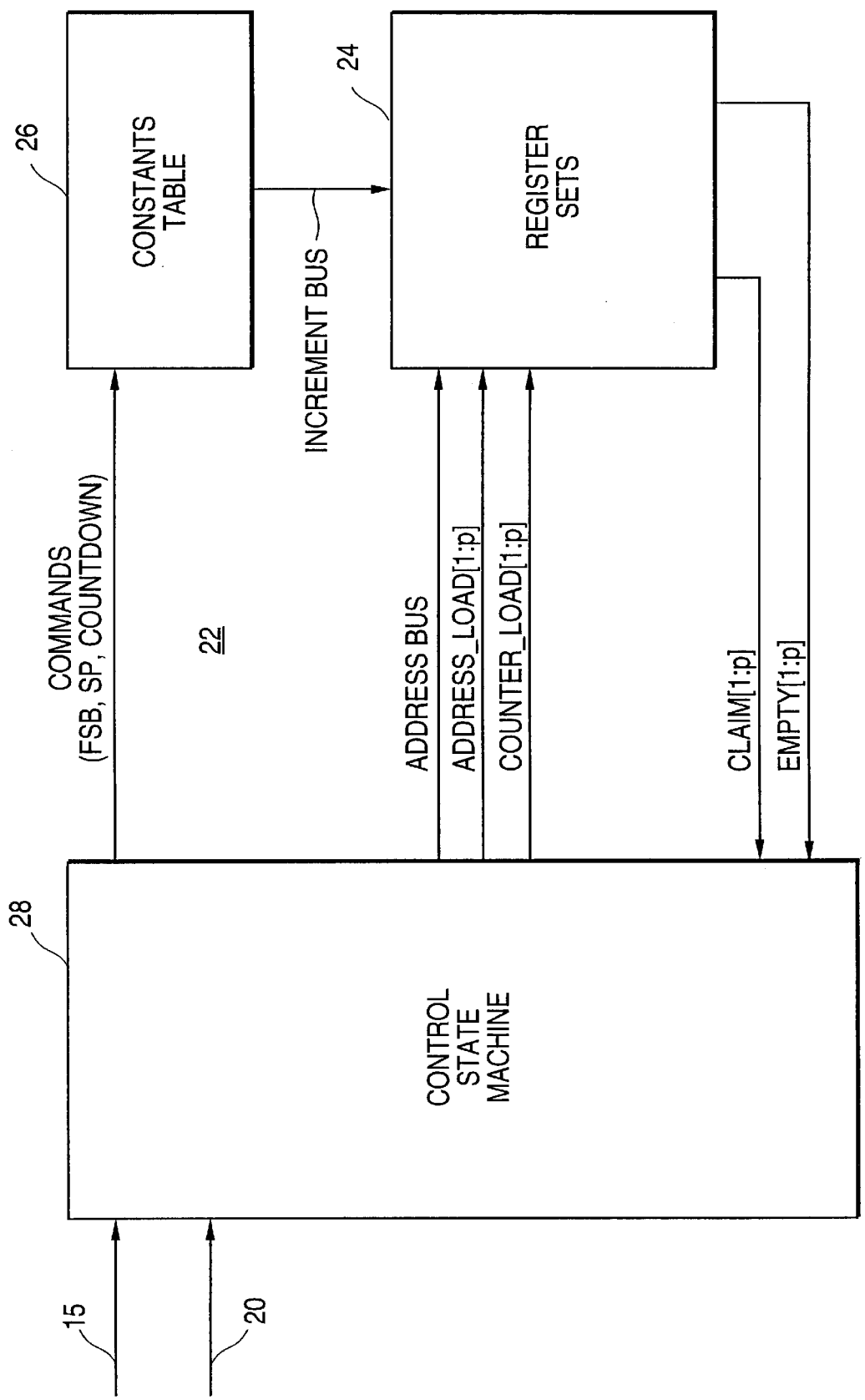
FIG. 2 shows an exemplary block diagram of a NUMA counter to be formed in each of the node controllers of FIG. 1.

FIG. 2 shows an exemplary overall block diagram of a NUMA counter 22 which can be provided in accordance with the present invention for each of the node controllers 14. The NUMA counter 22 includes register sets 24, a table with constants 26, and a control state machine 28. An example of the register sets 24 is provided in FIG. 3, and will be discussed in greater detail hereinafter. It is noted that in accordance with an exemplary embodiment of the present invention described hereinafter, a first group of register sets can be provided to maintain a count for deciding migration, while a second group of register sets can be provided for deciding replication. On the other hand, a single set of register sets could be provided at each node to maintain a count for both migration and replication, if preferred.

Figure 9:
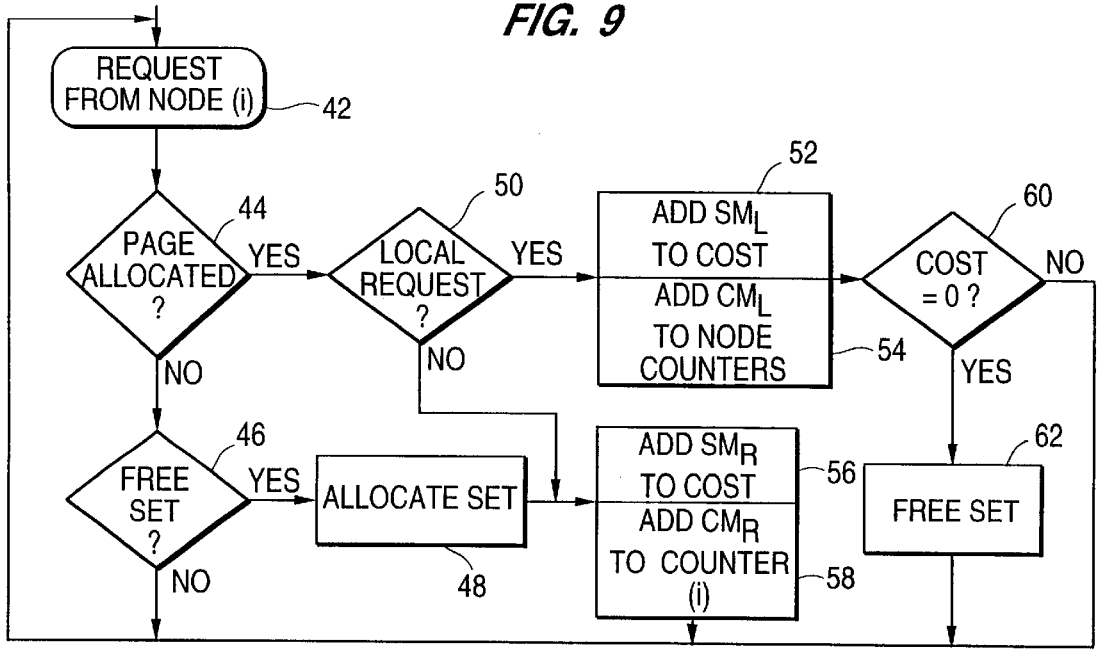
FIG. 9 shows an exemplary process for determining the best candidate pages to migrate in accordance with the present invention.
Figure 10:
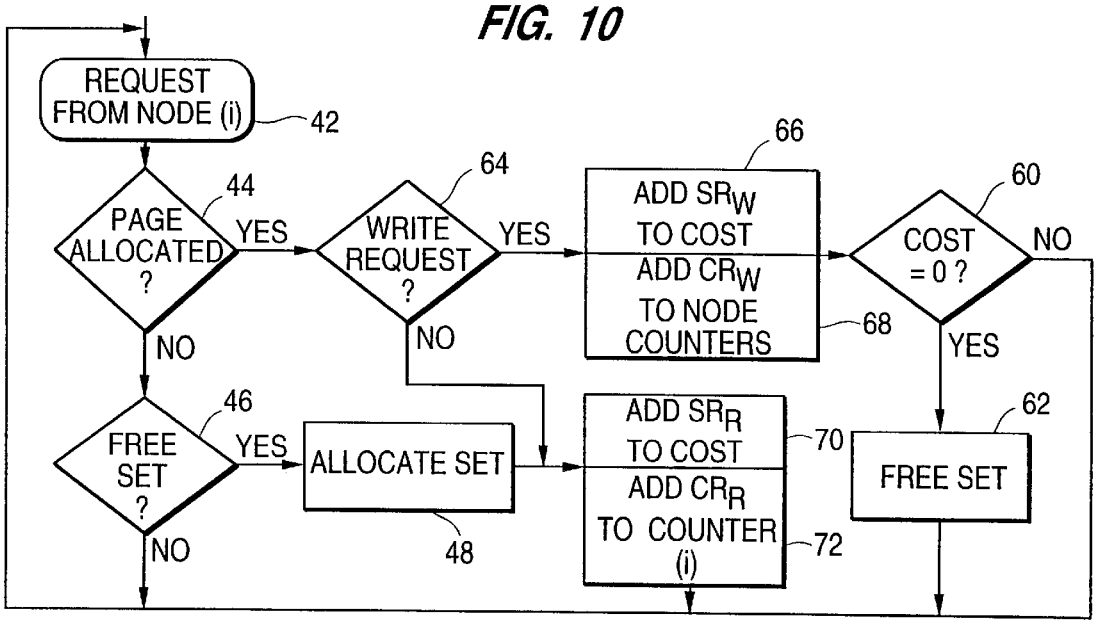
FIG. 10 shows an exemplary process for determining the best candidate pages to replicate in accordance with the present invention.

The constants table 26 provides constants which are used in conjunction with the register sets 24 for incrementing and decrementing the register sets in accordance with the operational flowcharts shown, for example, in FIGS. 9 and 10. FIGS. 4, 5A, 5B and 6 show exemplary examples of constants tables that can be provided for this purpose, and these figures, as well as the processes shown in FIGS. 9 and 10, will be described in detail hereinafter. It is noted that the tables can be stored in any type of desired memory. In one embodiment, a static random access memory (SRAM) is used, but other types of memories, including Read-Only-Memories, Flash Memory, etc. can be utilized, if preferred.

The control state machine 28 is coupled to the Front Side Bus 15 (FSB) and the scalability port 20 (SP) of each node controller 14. The control state machine 28 samples the FSB and SP requests for accesses to pages of the particular node memory 16. The control state machine 28 also forces the decrementing of all counters every N samples using a global enable signal in order to provide an aging mechanism to the register sets 24. As shown in FIG. 2, the control state machine 28 provides commands based on the FSB 15, the SP 20 and also provides a countdown to the constants table. In turn, the constants table 26 provides increment and decrement constants to the register sets 24, as will be discussed hereinafter. The control state machine 28 also provides control signals for Address, Address-load and Counter-load to the register sets 24. Claim and Empty Signals are, in turn, provided from the register sets 24 to the control state machine 28. The Claim signals indicate if register cells of the register sets 24 responded to a lookup from the control state machine 28 in response to address requests from the FSB 15 and the SP 20. The Empty signals indicate if register cells contain a zero value in their cost counter.

Figures 3, 4:
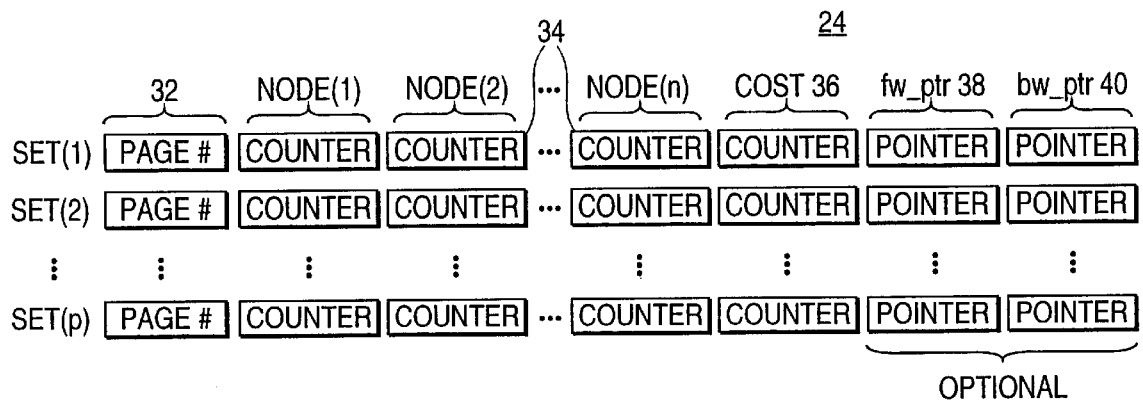

FIG. 3 shows a register set structure which can be used for the register sets 24 of FIG. 2. As noted above, preferably, one group of register sets 24 is provided for migration and another group of register sets 24 is provided for replication. These register sets for migration and replication can be identical in structure, if desired, although the invention is not limited to this. In any event, as will be discussed later with regard to FIGS. 9 and 10, even though the register sets for migration and replication can be identical in structure, generally their contents will differ based on the different operations applied to them for migration and replication that are initiated by different values in the constant tables.

As shown in FIG. 3, the register sets 24 can be constructed as a content-addressable memory wherein the register sets are indexed in accordance with physical page addresses of the pages within the node memory 16. As such, the page numbers are stored in the address field 32 of the register sets 24 with one set of registers being allocated to each of the pages that is being tracked. Register sets 24 also include one counter 34 of b bits for each node of the NUMA system 10, and one cost field 36 for each page being tracked, also using counters 34. The counters 34 can count from 0 to $2^{b-1}$, and can be non-wrapping. As will be discussed in greater detail hereinafter with regard to FIGS. 13–16, each non-free register set allocated to a page may also be represented in sorted order based on the cost field 36, using the forward pointers 38 and the backward pointers 40.

The purpose of hardware structure shown in FIGS. 1–3 is to keep track of the local memory pages in a given node that exhibit the most interesting activity. To this end, a stream of bus transaction to a node's memory controller 14 is fed through counter control logic, an example of which will be discussed hereinafter with reference to FIG. 12. Bus transactions can be initiated from a node's own processor (local request) or from processors in other nodes (remote request), and, in either case, carry enough information to identify the initiating node. For each transaction, the control logic performs a lookup in the register sets 24 to locate a register set for a given requested page. If a set is not found and a free set exists, a set will be allocated for the requested page. Otherwise, the bus transaction is ignored.

If the page is found to have already been allocated in the address field 32 of the register sets 24, or if it has just been allocated, the counter logic operates in conjunction with the control state machine 28 and the constants table 26 to determine if the transaction should be monitored and what the appropriate action should be for the given event. Different constants tables can be used for bus transactions initiated from local vs. remote processors. Valid actions can include, for example:

(a) ignore the transaction;

(b) decrement all the counters in the register set by a constant;

(c) increment all the counters in the register set by a constant;

(d) increment the counter for the node that initiated the request by a constant; and (e) decrement the counter for the node that initiated the request by a constant.

If all of the registers in a register set 24 are less than or equal to 0, the register set is de-allocated.

In addition to the transaction-initiated counting activity, the counter logic also implements an aging mechanism that decrements all the counters in all the register sets every few cycles so that is only keeps track of recent activity. In this way, the register sets will maintain information only with regard to pages of the memory that have been requested relatively recently. Of course, the frequency with which the counters are aged can be adjusted depending upon the requirements of a particular system.

Finally, if desired, the control logic can be responsible for delivering the current contents of the counter structure to the operating system when requested to do so. It is recommended (although not required) that any such operation be carried out in an ordered manner so that the register sets with the greatest cost will be delivered first. Alternatively, in accordance with another exemplary embodiment illustrated, for example, in FIGS. 13–16, forward and backward pointers can be used for providing an ordered set of costs regarding the information stored in the register sets 24.

The counter structure shown in FIG. 3 can be used in the implementation of NUMA page migration and replication policies if the control state machine 28, the constants table 26 and the counter control logic is set up to perform certain operations for the register sets 24 used for migration and the different register sets 24 used for replication. Broadly speaking, migration can be carried out if, for all locally initiated bus transactions, all counters 34 in a register set allocated to the requested page are decremented. On the other hand, for all remotely initiated bus transactions to a particular page, the counter 34 for the node that initiated the transaction should be incremented. This, in effect, carries out the process of migration by a local vs. remote analysis.

For the register sets 24 used for replication, generally all counters 34 for a particular page that receives a write request are decremented. On the other hand, for all bus transactions that denote read requests, a counter 34 corresponding to the node that initiated the transaction is incremented. Thus, for the replication process, an analysis of write vs. read is carried out.

FIGS. 4, 5A, 5B and 6 show examples of tables of constants that can be used for the constants table 26 shown in FIG. 2. In FIG. 4, an example of constants stored for migration at node #2 for all bus/port transactions in a NUMA system 10 is illustrated. The control state machine 28 can use such a table 26 as shown in FIG. 2 to manage the register structure sample transactions from the FSB 15 and the SP 20. For each sample, the constants table 26 such as shown in FIG. 4 can be accessed for the transaction type to which the sample belongs, using the node number of the transaction source. For example, if the source of the transaction is node #1, then counter #1 for the requested page in the register sets 24 for migration is incremented by the constant $M_R$ (where $M_R$ is greater than 0). It is noted that the counter numbers shown in the constants table of FIG. 4 correspond, in each case, to node numbers. In other words, referring to FIG. 3, if the register set structure 24 is presently maintaining a count for pages 1, 2, and 12 of a node memory 16, then three counters #1 would presently be active, one for each of pages 1, 2 and 12. If the bus/port transaction is a remote request from node 1 for page 1 (noting that the constant table of FIG. 4 is, in this example, located at node number 2), then the constants table of FIG. 4 would apply the positive constant $M_R$ to counter #1 in set (1) allocated for page number 1 in the register set 24. Also, the constant $M_R$ would be added to the cost field 36 counter corresponding to page number 1. As shown in FIG. 4, 0 would be added to any of the other counters corresponding to the other nodes, including the counter #2 corresponding to the local node number 2. It is noted from the above discussion that the cost $M_R$ constant added to the cost field 36 for the counter corresponding to page 1 indicates the cost of having page 1 stored at node 2 rather than stored at the requesting remote node #1.

If a local request is made by node 2 for one of its own pages, then the negative constant $M_L$ is applied to all counters 34 in the register set corresponding to the requested page. For example, if node number 2 requests its own page 1, then each and every counter 34 in the register set corresponding to page 1 is decremented by the negative constant $M_L$. At the same time, in the example shown in FIG. 4, the cost field 36 for the particular page is decremented by the constant $N.M_L$, where N is an integer. The significance of this is that any time a local request is made for a page within a node, this effectively serves as a factor for not migrating the requested page to any remote node.

FIGS. 5A and 5B show similar tables which are used for storing replication constants at the same node #2. FIG. 5A pertains to Bus Read Line requests (BRL). FIG. 5B pertains to Bus Read Invalidate Line/Bus Invalidate Line (BRIL/BIL) requests. BRL effectively is a request for permission to read. BIL is effectively a request for permission to write. BRIL is a request for permission to either write or read. As will be discussed later, these constants are effectively used to increment counters when a request for a read operation is made (e.g., BRL transactions) since this indicates a cost associated with storing a requested page at a local node when, in fact, it is being requested by a remote node. On the other hand, when a request associated with a write operation is made, it is a benefit to retain the requested page at a local location.

FIG. 6 shows a table of constants to be used for aging. An aging event can be triggered once every K transaction samples, and affects all non-free counter sets in the register set structure 24. Basically, the aging process serves to decrement all of the counters to account for the fact that the information is aging. In other words, by periodically applying the constants shown in FIG. 6 to the registers of the non-free register sets 24 in FIG. 3, it is ensured that only relatively recent information will be retained in the register sets.

FIGS. 7, 8A and 8B are exemplary condensed constant tables that can be used as an alternative to constant tables such as shown in FIGS. 4, 5A and 5B. Specifically, as a cost optimization to reduce the amount of storage required to keep all of the constants shown in the earlier figures, one can assume that the counter line for a given node i is fixed to (0,0,0 . . . 1, . . . 0). In other words, it can be assumed that a value of 1 exists in a position i in the line for the node i. In effect, with this arrangement, the node counters will simply count the number of samples that have been processed. These condensed tables are as suitable for identifying candidate pages for migration/replication as the full tables shown in FIGS. 4, 5A and 5B. However, they offer less flexibility to implement other performance monitoring and tuning policies that could be implemented in accordance with the present invention. It is noted that the condensed constant table shown in FIG. 7 is an example of migration constants which can be used at node number 2 of the NUMA system for all bus/port transactions while FIG. 8A is an example of replication constants at the same node number 2 for BRL transactions, and FIG. 8B is an example of replication constants that can be used for the same node number 2 for BRIL/BIL transactions.

Figure 12:
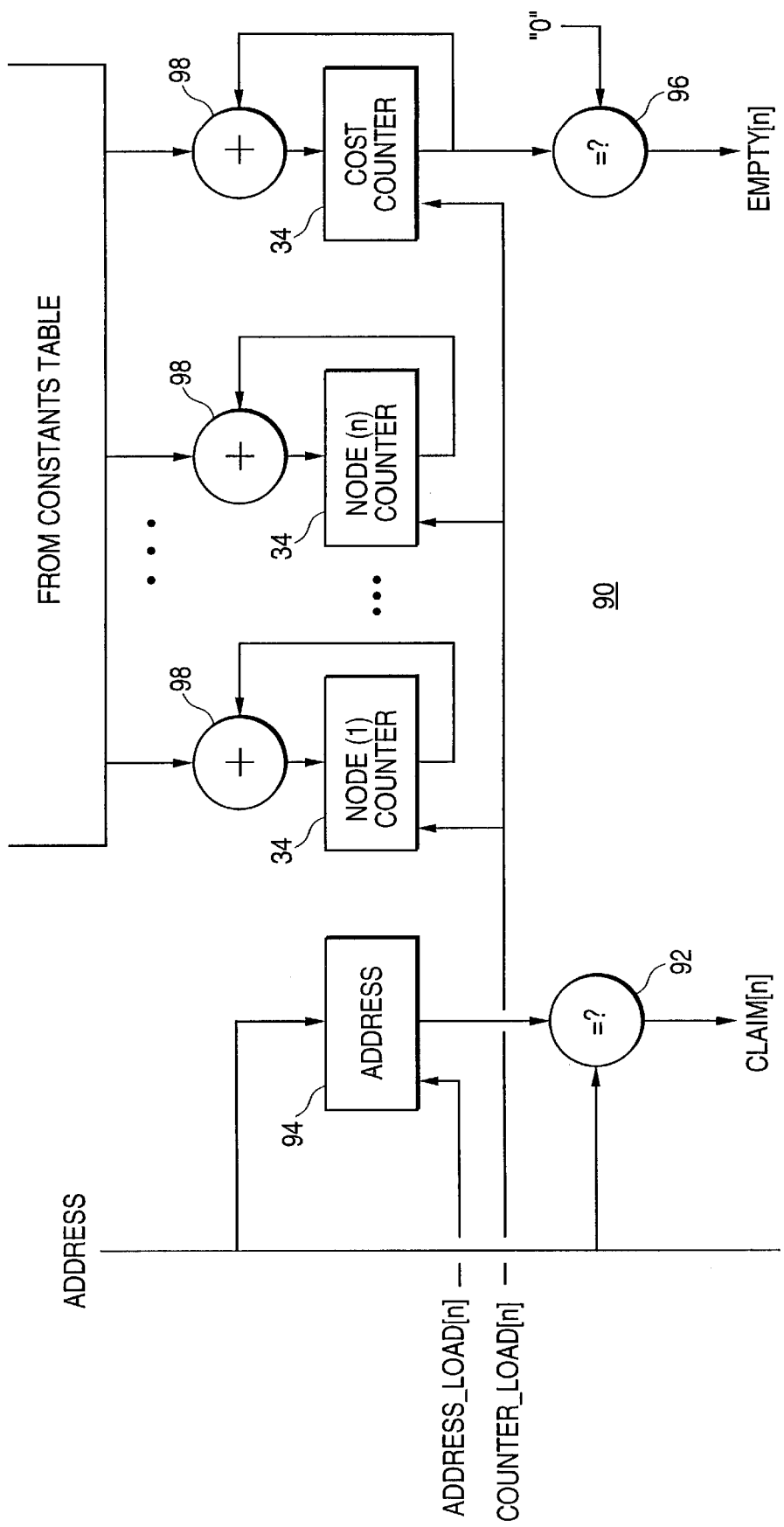
FIG. 12 shows an exemplary block diagram of counter control logic which can be used in accordance with the present invention to control the contents of register sets such as shown in FIG. 3.

Referring to FIG. 9, an exemplary flowchart for a migration operation is shown that can be implemented using register sets 24 such as shown in FIG. 3 and constants tables such as discussed above. The process shown in FIG. 9 is carried out under the control of the control state machine 28 shown in FIG. 2 using counter logic such as shown in FIG. 12, for example.

In FIG. 9, step 42 shows a request from a node (i) for a page of the local node where the migration register sets 24 are located. The node (i) can be either the local node itself or a remote node. Step 44 determines whether a register set has already been allocated for the requested page. If the answer is no, step 46 determines whether a free set is available. If a free set is not available, the transaction will be ignored. Otherwise, if a free set is available, it will be allocated in step 48.

Turning to step 44, if a register set has been allocated for the page in question, a determination is made in step 50 as to whether the requesting node is the local node itself or a remote node. If the request is a local request, then the value $SM_L$ is added to the cost field 36 of the register set corresponding to the requested page. As noted in the earlier discussion, this will effectively decrement the cost since it is a local request. Also, the value $CM_L$ will be added to all of the node counters corresponding to the requested page in step 54.

On the other hand, if the result of step 50 is to indicate that the request from step 42 is not a local request, then steps 56 and 58 are carried out. In step 56, the cost field 36 for the page in question is incremented by the positive factor $SM_R$. Also, the particular counter (i) corresponding to the requested node is incremented by the value $CM_R$. It is noted that if a register set has just been allocated for a particular page in the step 48, then, in accordance with the particular migration flow diagram shown in FIG. 9, the cost counter and the particular counter of the requesting node will be incremented, even if the first time request for this page is a local request. On the other hand, the flow diagram could be modified so that, anytime the first time request is a local request, a set will not be allocated even if one is free.

In step 60, if steps 52 and 54 have been performed to effectively decrement counters, the question will be asked whether the cost has reduced to zero. If the answer to this question is yes, then step 62 will operate to free the set for another page. In effect, this provides an indication that the cost of remote access is less than the advantage of keeping the page locally. In accordance with the general principle of the present invention, the particular page in question becomes a less interesting event in terms of "interesting" being defined by the standard of pages which receive the most remote requests.

As will be discussed in further detail in FIGS. 13–16, maintaining a register set structure 24 for migration in each of the nodes using the flowchart process of FIG. 9 can help to determine the best pages for migration. Basically, this is done by relying on the cost field 36 which develops as a result of carrying out the exemplary process shown in FIG. 9. As the cost for certain pages increases, a determination can be made by the operating system as to which are the best pages for migration. After that, it must be determined which node the page should be migrated to. Therefore, the second step in the migration process is to examine the node counters 34 of the selected pages and then, for each page, select the node with the highest value in its corresponding node counter as the location to migrate the page to.

FIG. 10 shows an exemplary process for replication. To some extent, this is similar to FIG. 9, but significant differences exist, as will be discussed below. For purposes of simplicity, steps 42, 44, 46, 48, 60 and 62 are indicated by the same numerals in FIG. 10 to correspond to substantially the identical steps from FIG. 9.

The first difference between FIGS. 9 and 10 occurs with the substitution of step 64 for step 50. Step 64 analyzes whether a request for which a page has already been allocated is a write request. If the request is a write request, step 66 adds the value $SR_W$ to the cost field 36 of a register set structure 24 that has been designated to determine which pages to replicate. The value $CR_W$ is added to all of the node counters for the requested page. It should be noted that steps 66 and 68 are effectively decrementing operations since the constant $R_W$ is a negative constant. This is appropriate since write operations militate against replication. After such a decrementing operation, steps 60 and 62 carry out the same function as in FIG. 9 for determining whether to free a set for the requested page or not.

Assuming that the answer to step 64 is no, it is then known that the request is a read request. In that case, step 70 adds the value $SR_R$ to the cost field 36 of the register set structure 24 of the requested page, and step 72 adds the value CRR to the counter corresponding to the requesting node.

Figure 11:
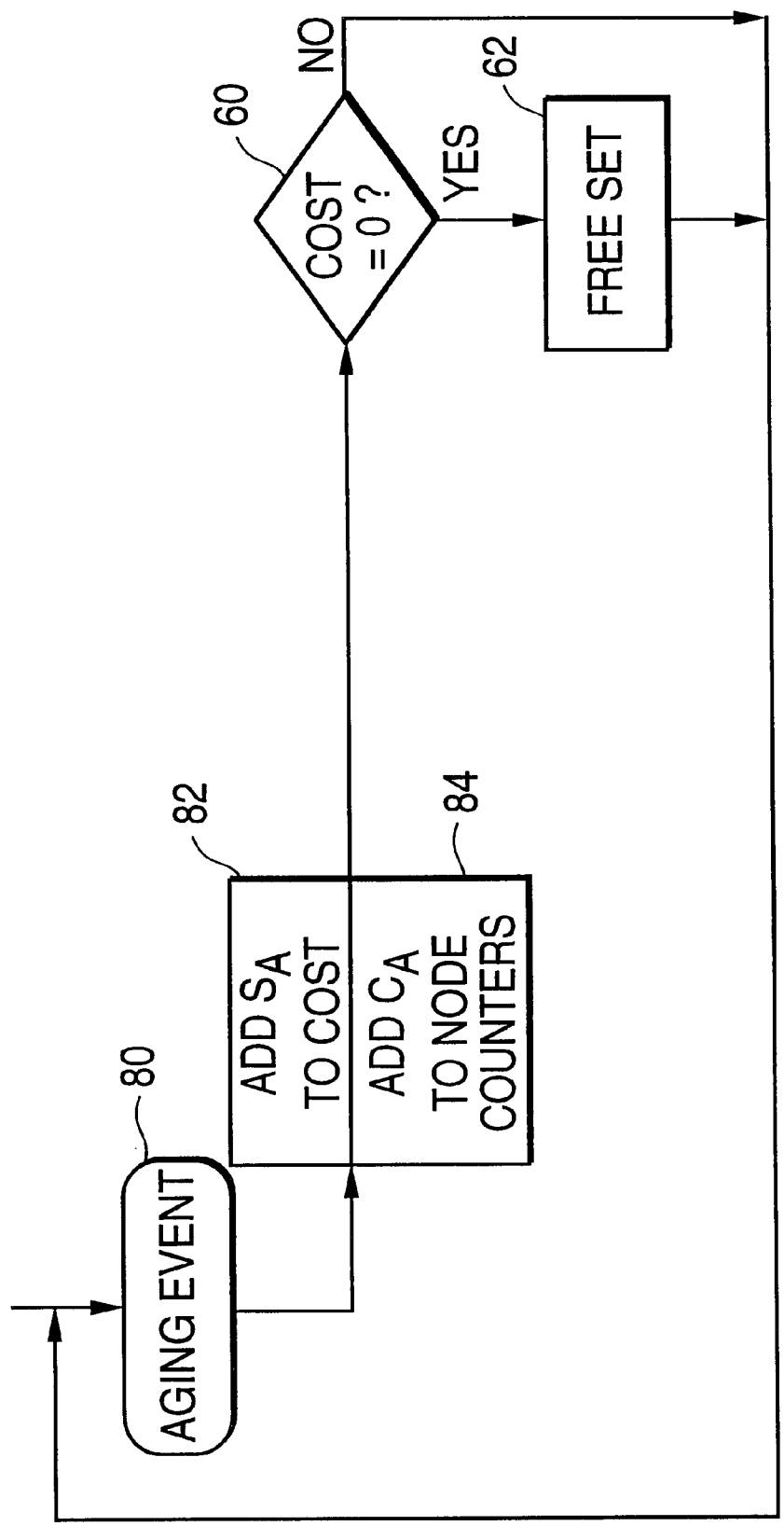
FIG. 11 shows an exemplary process for aging the data stored in the register sets of FIGS. 2 and 3.

FIG. 11 is an exemplary process of an aging operation which can be used for all non-free counter sets in each of the migration and replication register set structures 24. In step 80, an aging event will be designated by the control state machine 28 to occur every k transaction samples. Step 82 will add a negative constant $S_A$ to the cost field of all of the pages presently being monitored, while step 84 will add a negative factor CA to all of the node counters which are presently non-free. Steps 60 and 62 in FIG. 11 correspond to steps having the same numerals in FIGS. 9 and 10.

Figure 13:
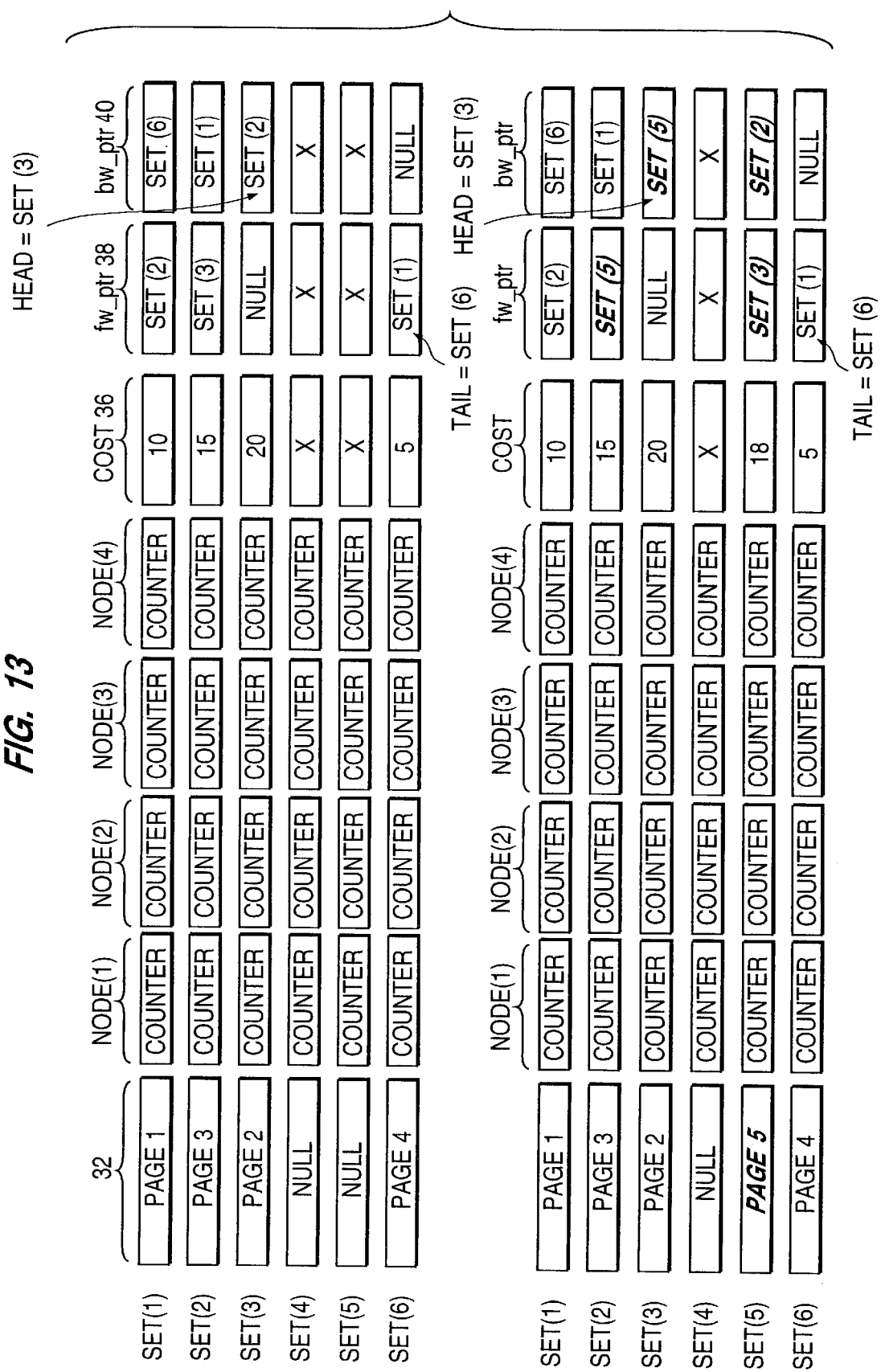
FIGS. 13–16 are exemplary illustrations of the operation of the register sets with forward and backward pointers during different bus transactions and aging events, in accordance with the present invention.
Figure 14:
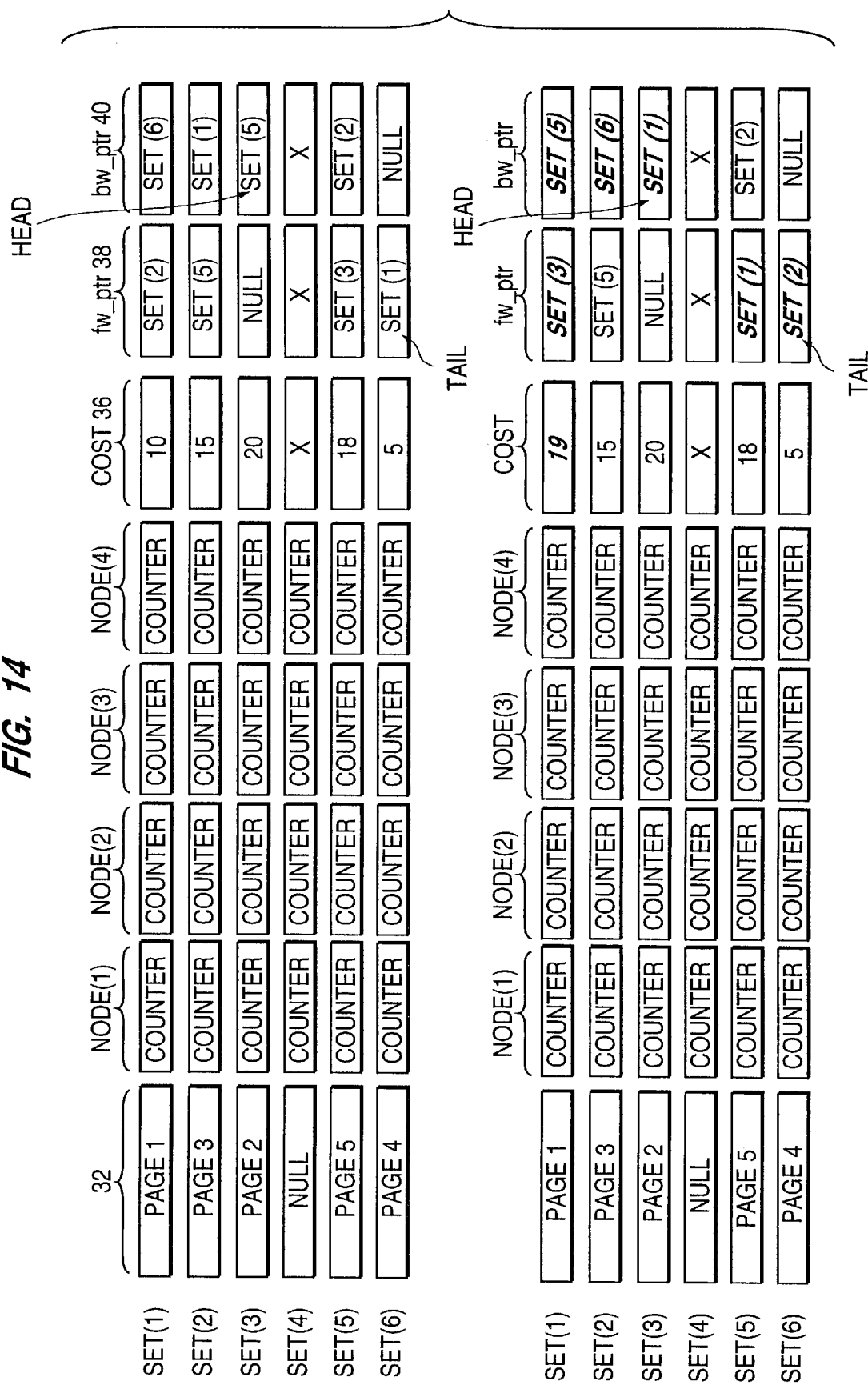
Figure 15:
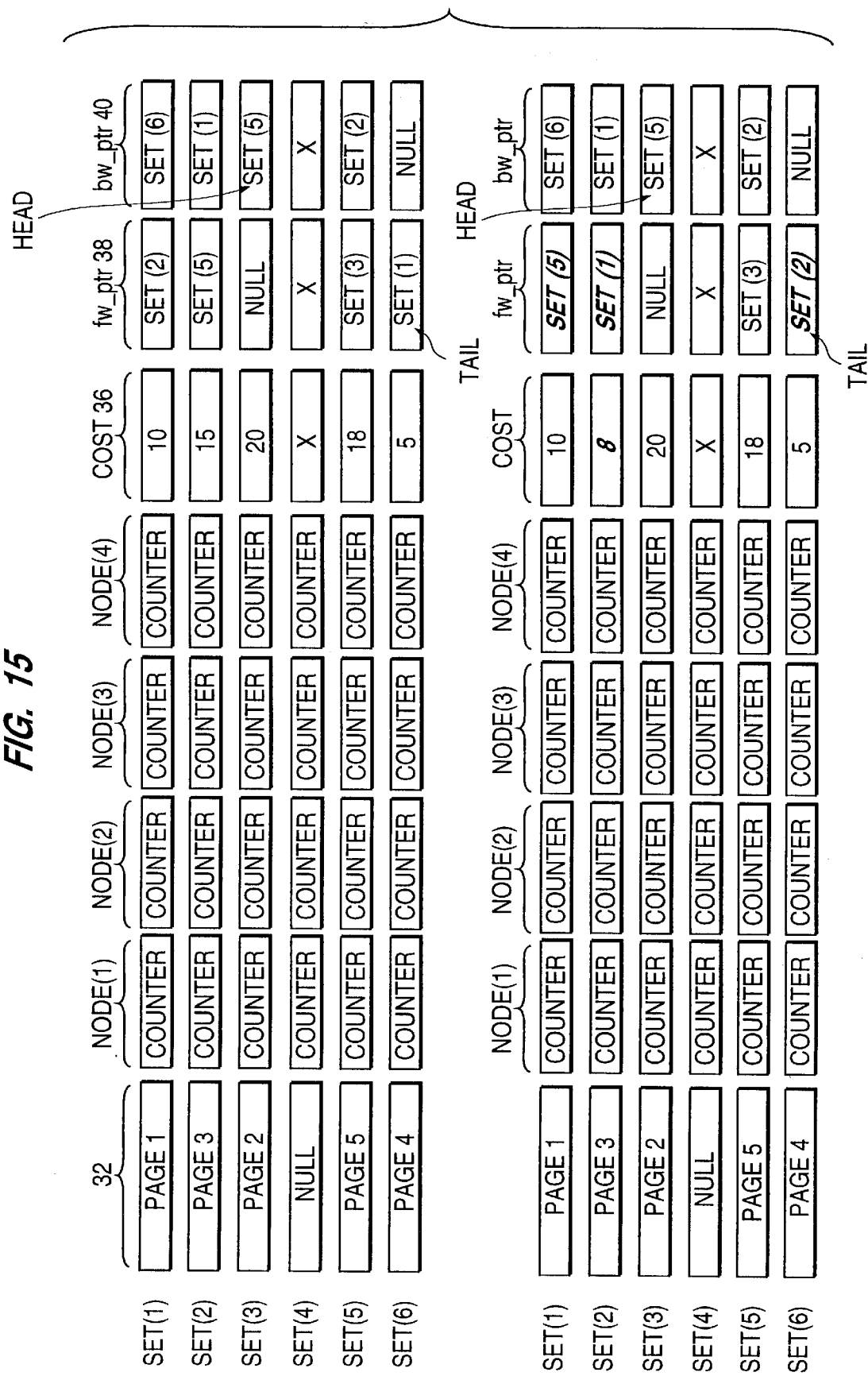
Figure 16:
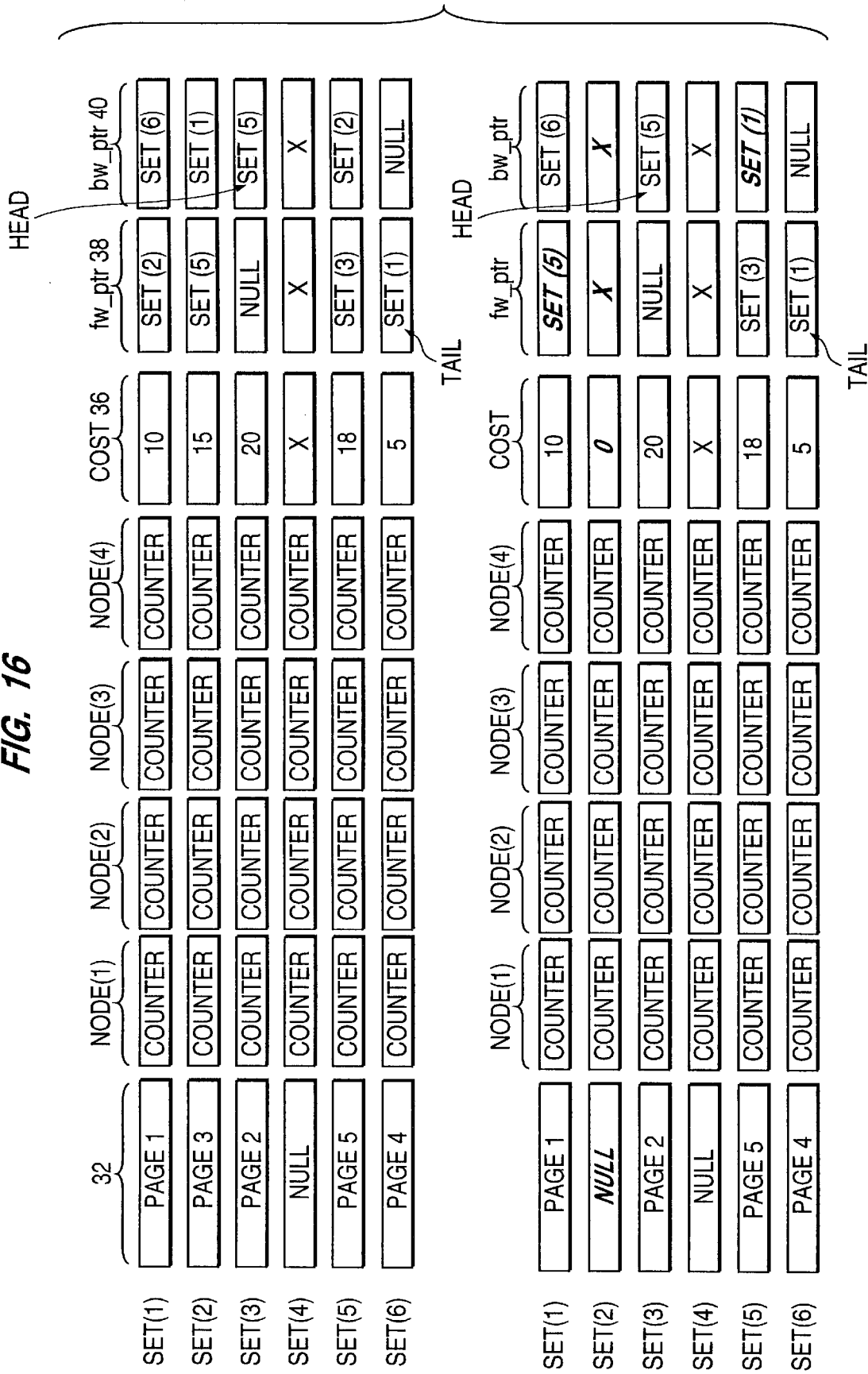

FIGS. 13–16 are examples of four operations that can occur when a bus transaction is sampled or when an aging event occurs. FIG. 13 shows the allocation of a register set to insert a new page, FIG. 14 shows the positive incrementing of the cost register in a register set, FIG. 15 shows the decrementing of the cost register in a register set, and FIG. 16 shows the decrementing of the cost register leading to the cost becoming zero (e.g., as per steps 60 and 62 in FIGS. 9–11). It is noted that the control state machine 28 can carry out these operations by manipulating the fields of the register sets and optionally maintaining the forward and backward pointers in the manner shown.

Referring first to FIG. 13, the top portion of the figure shows the counter state before a sampling event arrives, and the bottom portion of the figure shows the change which occurs because of the sample event. In comparing the top and bottom portions of FIG. 13, it can be seen in the top portion that before the sampling event arrives, sets 4 and 5 are both free. Based on carrying out processes such as shown in FIGS. 9 or 10, the existence of a free set for a requested page (in this case, page 5) is recognized, and set number 5 is assigned to the requested page 5. This causes changes in the forward and backward pointers which can be seen by comparing the states of these pointers in the bottom portion of FIG. 13 with the states shown in the top portion of FIG. 13. Basically, the forward pointer is a pointer in a linked list that contains the address (location) of the next element in the list, whereas the backward pointer contains the address of the previous element in the list. Thus, the forward and backward pointers 38 and 40 effectively provide an ordered structure for the cost field 36 which can be analyzed by the operating system to determine the best pages to migrate and/or replicate.

FIG. 14 shows an example of positively incrementing a cost register in response to a sampling or aging event which occurs. In this case, the constant which is added to the cost field 36 is a positive value. As can be seen by comparing the upper portion of FIG. 14 (the state before the positive cost change) and the lower portion of FIG. 14 (the state after the cost change), it can be seen that the positive change can move a page forward in the sorted list. In this case, the cost for page 1 from the transaction is a substantial increase from a cost of 10 to a cost of 19. This requires updating of the forward and backward pointers 38 and 40, not only for set 1 corresponding to page 1, but also for several other sets corresponding to different pages. These changes reflect the relative cost 19 compared to the costs of other pages being monitored.

FIG. 15 shows a reverse situation where set 2, monitoring page 1, has its cost decremented from 15 to 8. This causes corresponding changes to be made in the forward and backward pointers 38 and 40 to define the ordered structure regarding the cost field 36. In effect, this moves page 3 backward in the sorted list.

Finally, FIG. 16 shows an operation where event sampling causes a decrementing of the cost counter for a given page (in this case, page 3) to the point that the set (2) which had previously been used for page 3 is declared a free set. This is carried out with steps 60 and 62 discussed above for FIGS. 9–11.

It is noted that the examples shown in FIGS. 13–16 do not show changes in the node counters themselves because the values actually stored in these counters do not affect the operation of the pointers and the order in the list. It is recognized, of course, that the events which cause the change in the cost field 36 in FIGS. 13–16 will, of course, cause changes in the actual values of the counter 34 shown for the respective nodes.

FIG. 12 shows an exemplary counter logic 90 that can be used, in conjunction with control signals from the control state machine 28, to set individual register counters 34 within the register set structure 24 shown in FIG. 3. The counter logic 90 shown in FIG. 12 could be located within the register set structure 24 itself to be provided for each of the counters 34 as part of a counter cell, or, if desired, located outside of the register sets as a separate logic structure (not shown). As shown in FIG. 12, the control logic circuit 90 receive the Address-load, Counter-load and address bus signals from the control state machine 28. The control logic circuit 90 also includes comparators 92 and 96 and adders 98 whose operation will be discussed below.

To begin operation, a comparator 92 first compares the address on the address bus from the control state machine 28 with the address (if any) stored in an address portion 94 of the register set. As noted above, the register set structure 24 can be a Content-Addressable-Memory (CAM) in which the address portion 94 will be an allocated page number of a local page stored in the node memory 16. The allocated page number will change depending on which page a given set of registers is allocated to at the time (e.g., see FIG. 3). If the comparator 92 indicates that the page number on the address bus corresponds to the page number of the address portion 94, the counters 34 will be either incremented, decremented or unchanged, depending on the nature of the sample signal provided on the increment bus from the table 26. The nature of the signal provided by the table 26 on the increment bus is determined by the control state machine 28 in the manner discussed earlier, for example, in accordance with processes such as shown in FIGS. 9 and 10, depending on whether the counter 34 is to be used with is for migration or replication.

If the control state machine 28 decides to allocate a register set, it will examine the Empty signals of the register sets in order to locate a free set. If a free set exists, the control state machine 28 will put the page address on the Address bus and set the Address-load signal for that set so as to load the address portion of the register set. It is understood (but not shown) that by loading the address portion of a register set, the set counters are also initialized to zero. After allocation and initialization the control state machine 28 can update the counters as it has been described previously.

The control state machine 28 unconditionally updates all of the counters in a group of register sets by setting the Counter-load signals for all register sets. This can be used, for example, with the aging process shown in FIG. 11 to periodically decrement all of the counters 34 to ensure that only relatively recent high cost pages are tracked.

The actual incrementing or decrementing of the counters 34 can be carried out through a No-Wrap-Around-Adder 98. Specifically, the adder 98 receives the present output of the counter and the sample on the increment bus, and provides a sum of these values. The output of the adder 98 is then used to increment or decrement the counter 34.

From the above description, it can be seen that the counter logic 90 of FIG. 12 can be provided for the counter 34 for each of the register set structures 24 provided at each node controller 14. With this control logic arrangement, the NUMA system can operate under the control of the control state machines 28 at each node controller 14 to use the constants provided by the tables 26 to carry out processes such as shown in FIGS. 9–11. It is to be understood that the present invention is not limited to any of the specific structures or steps shown in these various figures but could be carried out with other arrangements operating under the same principles disclosed regarding the present invention.

It is noted that when the present invention is used to carry out the processes of migration and replication in a NUMA system, it has certain advantages over migration and/or replication arrangements described earlier herein. For example, in the previously noted Abramson et al. and Laudon et al. systems, the counters increase towards higher values. When the values stored in the counters meet certain conditions, an action is initiated in the operating system. In contrast, in the present invention, the counters maintain the difference between competing classes of events. Therefore, the present invention is able to identify exactly those pages that the operating system considers most interesting.

Also, the Abramson et al. and Laudon et al. systems collect information for all pages in the system. As such, they associate a set of registers with each memory page that keeps track of the coherence activity for that page. On the other hand, the present invention maintains information only for the most active pages of every node. Therefore, the storage requirements for the counters in the present system are significantly reduced compared with the Abramson et al. and Laudon et al. systems.

It is also noted that unlike the Laudon et al. system that triggers an interrupt when the page is declared a possible candidate for migration/replication, in the present invention the operating system can choose when to consider candidate pages for migration/replication. Thus, it is not necessary to incur an interrupt overhead for these operations. Also, unlike the Abramson et al. system that requires an operating system daemon to maintain the counters, in the present invention no such software overhead is associated with maintaining the counters. In the present invention, the counter structure will always point to the most interesting pages, regardless of whether the operating system chooses to check their contents or not.

The Abramson system is restricted to solving page migration problems for single-threaded processes. Therefore, it does not have provisions to keep track of pages accessed by more than one node at a time nor does it deal with page replication. Instead, each node keeps track of its own accesses and attempts to bring closer to itself the pages that it accesses. In the present invention, all the information that the system may be keeping about a page resides at the memory controller for the node the page is located in. Furthermore, the information is broken down according to the processor that initiated the request. It is noted that the Laudon arrangement is more applicable to modern multi-threaded shared memory applications that the Abramson system since it maintains per node information. However, its applicability is restricted in system architectures that can maintain a distinct counter per page.

A final important advantage of the present invention is its flexibility in selecting bus transactions that can be monitored and how they should be counted. This enables the use of mechanisms for other event monitoring activities, for example, application tuning.

Although the above description was primary directed to the use of the invention in NUMA systems, it is to be understood that the present invention can be used in any processor system wherein the pages of the memory are distributed throughout the total main memory. It is also noted that, although the above description has been primarily directed to migration and/or replication operations, the present invention is not limited to this, but can be used for other types of event monitoring due to its flexibility. For example, the present invention could be used in conjunction with performance optimizations such as the ones described in "Reactive NUMA: A design for unifying S-COMA and CC-NUMA" Babak Falsafi and David A. Wood, Proceedings of the 24th International Symposium on Computer Architecture (ISCA), June 1997.

The invention may be embodied in other specific forms without departing from the spirit or essential characteristic thereof. The present embodiments are therefore to be considered in all respects as illustrative and not restrictive.

We claim:

1. A processor system, comprising:
    a plurality of nodes, each including a processor and a portion of a total main memory of the processor system; and
    a counter including a plurality of register sets which track certain ones of a type of event which occur in the processor system for pages of the total main memory determined in accordance with a predetermined standard to be most interesting, while discarding other ones of the same type of event for pages of the total main memory determined by said standard to be less interesting, wherein the total number of register sets of said counter for tracking occurrences of said type of event is less than the total number of pages of the total main memory.

2. A system according to claim 1, wherein the type of event which is tracked or discarded in accordance with a predetermined standard is accesses to pages of the total main memory.

3. A system according to claim 2, wherein the predetermined standard of the most interesting events is based on the pages which receive the most requests for remote access from a node other than the node where the requested page is located.

4. A system according to claim 3, wherein a plurality of said counters are provided, with each of said nodes including at least one of said counters, wherein each of said counters tracks remote accesses to pages of a node where the counter is located and cost of the remote accesses.

5. A system according to claim 4, wherein an operating system of the processor system determines whether to migrate and/or replicate pages of the total main memory from one node to another based on the cost in terms of latency stored in said counters.

6. A system according to claim 3, further comprising an aging element periodically decrementing the contents of said counter.

7. A system according to claim 5, wherein the counters at each of the nodes each respectively include first register sets for storing data regarding remote access and cost to be evaluated by the operating system to determine which pages to migrate and second register sets for storing data regarding remote access and cost to be evaluated by the operating system to determine which pages to replicate.

8. A system according to claim 3, further comprising counter control logic for incrementing the counter for remote access to a page and decrementing the counter for local access to a page.

9. A system according to claim 3, wherein the counter is addressed in accordance with physical page addresses.

10. A system according to claim 7, wherein each of the counters further includes forward and backward pointers for providing an ordered set of the cost for migration and replication to be evaluated by the operating system in determining which pages to migrate and/or replicate.

11. A flexible event monitoring counter for use in a node controller of a Non-Uniform-Memory-Architecture (NUMA) system having a plurality of nodes, each including a processor, a node controller and predetermined pages of a total main memory of the NUMA system, wherein a counter monitors access requests to pages of the node in which it is located, wherein the counter comprises:
    first register sets for storing data to be used in determining whether any of the pages of the node should be migrated to another node;
    second register sets for storing data to be used in determining whether any of the pages of the node should be replicated to another node; and
    counter control logic which increments and decrements the first and second register sets in accordance with the number and the time of occurrence of remote accesses to pages of the node where the counter is located so that the first and second register sets will store data for a plurality of said pages which have been remotely accessed more often and/or more recently and not store data for others of said pages remotely accessed less often and/or less recently.

12. A counter according to claim 11, wherein the first and second register sets each include a plurality of register counters which are assigned to monitor remote access requests from other nodes, and at least one register counter to monitor local access requests from the node where the first and second register sets are located.

13. A counter according to claim 12, wherein the counter control logic decrements all register counters in one set of the the first register sets corresponding to a requested page for all local access requests for the requested page from the node where the page is located and increments a predetermined register counter of one of the the first register sets corresponding to a remote requesting node for each remote access to the page of the node from the remote requesting node.

14. A counter according to claim 12, wherein the counter control logic increments all register counters of one of the second register sets corresponding to a requested page for all access requests that are write requests and increments a predetermined register counter of the second one of the register sets corresponding to a remote node requesting a read access.

15. A counter according to claim 13, wherein the counter control logic periodically decrements the contents of all register counters of the first register sets to age the contents of the registers counters.

16. A counter according to claim 14, wherein the counter control logic periodically decrements the contents of all register counters of the second register sets to age the contents of the registers counter.

17. A counter according to claim 12, wherein the first and second register sets are addressed in accordance with physical page addresses of the pages of the corresponding node.

18. A counter according to claim 11, wherein the first and second register sets include register counters to store data regarding the number of remote page accesses and register counters to store data regarding the cost of the remote page accesses in terms of latency.

19. A counter according to claim 18, wherein an operating system of the NUMA system determines whether to migrate and/or replicate pages of the total main memory from one node to another based on the cost stored in said first and second register sets.

20. A counter according to claim 19, wherein the first and second register sets each include forward and backward pointers providing an ordered set of cost for migration and replication to be evaluated by the operating system in determining which pages to migrate and/or replicate.

21. A Non-Uniform-Memory-Architecture (NUMA) system, comprising:

a plurality of nodes, each including a processor, a node controller, and predetermined pages of a total main memory of the NUMA system, wherein each of the node controllers includes a counter for monitoring access requests to pages of the node, wherein the counter includes:

first register sets for storing data to be used in determining whether any of the pages of the node should be migrated to another node, including a first group of register counters for tracking local and remote accesses to predetermined pages of the node, and a second group of register counters for tracking cost of remote accesses to said pages and forward and backward pointers for establishing an ordered set of data stored in the second group of register counters;

second register sets for storing data to be used in determining whether any of the pages of the node should be replicated to another node, including a third group of register counters for tracking local and remote accesses to predetermined pages of the node, a fourth group of register counters for tracking cost of remote accesses to said pages, and forward and backward pointers for establishing an ordered set of data stored in the fourth group of register counters; and a constants table and counter control logic which increment and decrement the first and second register sets in accordance with the number of remote accesses to said pages of the node so that the first and second register sets will only store data for those pages which are remotely accessed most often.

22. A process of operating a Non-Uniform-Memory-Architecture (NUMA) system having a plurality of nodes, which each include a processor and a portion of a total main memory of the NUMA system, comprising:

monitoring a predetermined type of event which occurs in the NUMA system; and maintaining a count of certain ones of the type of event for pages of the total main memory determined in accordance with a predetermined standard to be most interesting while discarding other ones of the type of event for pages of the total main memory determined by said standard to be less interesting so that a total number of register sets of a counter used to count said events is less than the total number of pages of the total main memory.

23. A process according to claim 22, wherein the type of event which is tracked or discarded in accordance with the predetermined standard is page accesses to pages of the total main memory.

24. A process according to claim 23, wherein the predetermined standard of the most interesting events is based on the pages which receive the most requests for remote access.

25. A process of identifying the best pages of a Non-Uniform-Memory-Architecture (NUMA) system to migrate, wherein the NUMA system includes a plurality of nodes, each of which includes a processor, a plurality of pages of a total main memory of the NUMA system and a node controller including a counter having a plurality of register sets for storing data regarding the number of access requests to pages of the node from the node itself and from other nodes, comprising:

determining, whenever an access request is received in a node for a page of the node, whether a register set is available to count the request;

assigning a register set to count the access requests for the page if a register set is available;

incrementing a register counter in the allocated register set each time a remote request for access to the page is received from a corresponding remote node;

periodically decrementing all of the register sets to age out pages which infrequently receive remote access requests from remote nodes;

decrementing all registers counters in an allocated register set for a page of the node each time a local access request is received to the page from the node itself;

storing data for each of the pages monitored by the counter regarding the cost in terms of latency of the remote accesses to pages of the node;

establishing an ordered set of the cost; and selecting appropriate pages of the node for migration based on the ordered set of cost.

26. A process of identifying the best pages of a Non-Uniform-Memory-Architecture (NUMA) system to replicate, wherein the NUMA system includes a plurality of nodes, each of which includes a processor, a plurality of pages of a total main memory of the NUMA system and a node controller including a counter having a plurality of register sets for storing data regarding the number of access requests to pages of the node from the node itself and from other nodes, comprising:

determining, whenever an access request is received in a node for a page of the node, whether a register set is available to count the request;

assigning a register set to count the access requests for the page if a register set is available;

incrementing a register counter in the allocated register set each time a request for access from a node corresponding to the register counter;

periodically decrementing all of the register sets to age out pages which infrequently receive read access requests;

decrementing all register counters in an allocated register set for a page of the node each time a write access request is received to the page;

storing data for each of the pages monitored by the counter regarding the cost in terms of latency of the accesses to pages of the node;

establishing an ordered set of the cost; and selecting appropriate pages of the node for replication based on the ordered set of cost.

27. A processor system, comprising:

a plurality of nodes, each including a processor and a portion of a total main memory of the processor system; and a counter which tracks certain ones of a type of event which occur in the processor system determined in accordance with a predetermined standard to be most interesting, while discarding other ones of the same type of event determined by said standard to be less interesting;

wherein a plurality of said counters are provided, with each of said nodes including at least one of said counters, wherein each of said counters tracks remote accesses to pages of a node where the counter is located and cost of the remote accesses.

28. A processor system, comprising:

a plurality of nodes, each including a processor and a portion of a total main memory of the processor system;

a counter which tracks certain ones of a type of event which occur in the processor system determined in accordance with a predetermined standard to be most interesting, while discarding other ones of the same type of event determined by said standard to be less interesting; and an aging element which periodically decrements the contents of said counter.

29. A processor system, comprising:

a plurality of nodes, each including a processor and a portion of a total main memory of the processor system; and a counter including a plurality of register sets which track certain ones of a type of event which occur in the processor system for certain pages of the total main memory while discarding other ones of the same type of event for other pages of the total main memory.

30. A process of operating a Non-Uniform-Memory-Architecture (NUMA) system having a plurality of nodes, which each include a processor and a portion of a total main memory of the NUMA system, comprising:

monitoring a predetermined type of event which occurs in the NUMA system; and maintaining a count of certain ones of the type of event for certain pages of the total main memory while discarding other ones of the same type of event for other pages of the total main memory.

* * * * *